United States Patent
Swonger, Jr.

(10) Patent No.: US 7,111,982 B1
(45) Date of Patent: Sep. 26, 2006

(54) COMBINED TEMPERATURE AND PRESSURE PROBE FOR A GAS TURBINE ENGINE

(76) Inventor: Karl William Swonger, Jr., 3788 Hillendale Rd., Toledo, OH (US) 43606

( * ) Notice: Subject to any disclaimer, the term of this patent is extended or adjusted under 35 U.S.C. 154(b) by 0 days.

(21) Appl. No.: 10/768,491

(22) Filed: Jan. 30, 2004

(51) Int. Cl.
*G01K 1/14* (2006.01)
*G01K 7/02* (2006.01)

(52) U.S. Cl. .................. 374/143; 374/144; 374/179

(58) Field of Classification Search ............... 374/143, 374/144, 148, 138, 135, 142, 208; 60/803; 415/914, 118, 17, 26, 30, 47, 48; 416/61; 73/116, 117.3, 117.4

See application file for complete search history.

(56) References Cited

U.S. PATENT DOCUMENTS

| | | | |
|---|---|---|---|
| 1,031,679 A * | 7/1912 | Shank | 374/143 |
| 2,592,385 A * | 4/1952 | Borden et al. | 374/144 |
| 2,718,114 A * | 9/1955 | Haworth et al. | 60/39.281 |
| 2,971,997 A | 2/1961 | Carrico | |
| 3,343,417 A | 9/1967 | Peek | |
| 3,348,414 A | 10/1967 | Waters et al. | |
| 3,451,862 A | 6/1969 | Burgess, Jr. et al. | |
| 3,605,495 A | 9/1971 | Krause et al. | |
| 3,857,282 A * | 12/1974 | Doorley et al. | 73/168 |
| 4,132,114 A | 1/1979 | Shah et al. | |
| 4,152,938 A | 5/1979 | Danninger | |
| 4,244,222 A | 1/1981 | Hoyer et al. | |
| 4,433,584 A | 2/1984 | Kokoszka et al. | |
| 4,563,902 A * | 1/1986 | Kohnlechner | 374/143 |
| 4,580,910 A * | 4/1986 | Corwin | 374/144 |
| 4,605,315 A | 8/1986 | Kokoszka et al. | |
| 4,630,028 A * | 12/1986 | Kelly et al. | 340/449 |
| 4,633,213 A * | 12/1986 | Venema | 340/449 |
| 4,672,846 A | 6/1987 | LeBlond et al. | |
| 4,718,273 A | 1/1988 | McCormack | |
| 4,733,975 A * | 3/1988 | Komanetsky et al. | 374/144 |
| 4,765,751 A | 8/1988 | Pannone et al. | |
| 4,778,538 A * | 10/1988 | Lyman | 374/208 |
| 5,044,771 A * | 9/1991 | Masom | 374/208 |
| 5,067,355 A * | 11/1991 | Witte | 73/117.3 |
| 5,203,632 A * | 4/1993 | Fisher et al. | 374/144 |
| 5,234,315 A * | 8/1993 | Ogihara et al. | 415/16 |
| 6,170,345 B1 * | 1/2001 | Kerner | 73/866.5 |
| 6,457,857 B1 | 10/2002 | Gul | |
| 6,591,696 B1 | 7/2003 | Bachinski | |
| 2002/0122459 A1 * | 9/2002 | McFarland et al. | 374/179 |

FOREIGN PATENT DOCUMENTS

JP     2002201960 A  *  7/2002
JP     2003121210 A  *  4/2003

* cited by examiner

*Primary Examiner*—Diego Gutierrez
*Assistant Examiner*—Oxana Maslova
(74) *Attorney, Agent, or Firm*—MacMillan, Sobanski & Todd, LLC (57) ABSTRACT

A probe that includes both a temperature transducer and a pressure sensing port is adapted to be mounted upon and extend into the intake housing of a gas turbine engine. The probe is operative to provide air temperature and pressure data to an engine controller for the gas turbine engine.

22 Claims, 6 Drawing Sheets

COMBINED TEMPERATURE AND PRESSURE PROBE FOR A GAS TURBINE ENGINE

BACKGROUND OF THE INVENTION

This invention relates in general to gas turbine engines and in particular to a combined temperature and pressure probe for intake air to a gas turbine engine.

Figure 1:
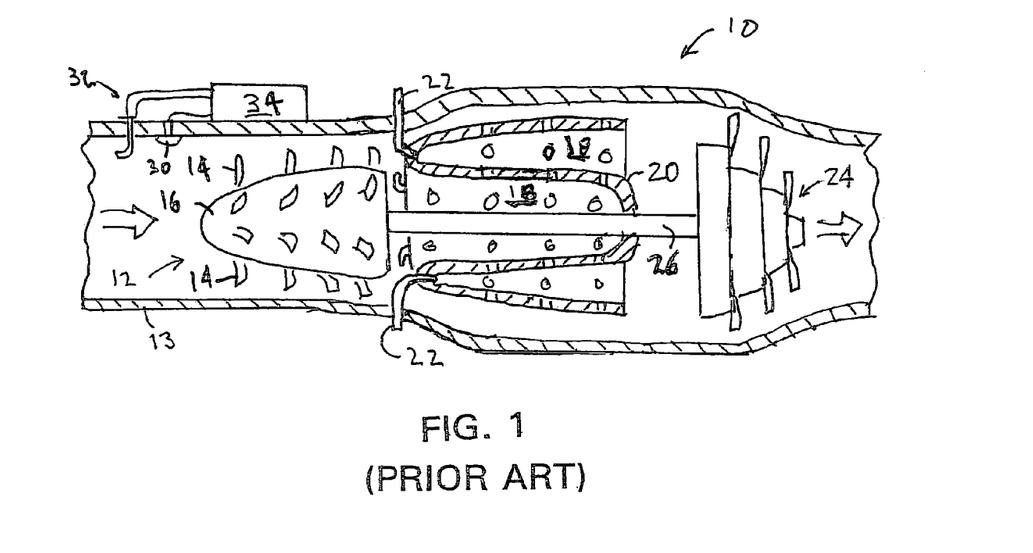
FIG. 1 is a sectional view of a typical gas turbine engine.

Gas turbine engines, or jet engines, have been widely adopted to power aircraft, where their simplicity and operating efficiency provides high reliability with low operating costs. A sectional view of a gas turbine engine is shown generally at 10 in FIG. 1. The engine 10 includes three primary parts. A compressor 12 located to the left of FIG. 1 is disposed within an engine intake housing 13. The compressor 12 consists of a plurality of fan blades 14 attached in rows to a cone-shaped cylinder 16. To the right of the compressor 12 is the second primary part of the engine, which is a combustion chamber 18. The combustion chamber 18 includes a perforated flame holder 20 that has a generally cylindrical shape. A plurality of fuel injectors are 22 positioned at the left end of the flame holder 20. To the right of the gas turbine engine 10 is a multi-bladed turbine 24 that forms the third primary part of the engine. The turbine 24 is connected by a rotatable shaft 26 that passes through the combustion chamber 18 to the compressor 12. Thus, rotation of the turbine 24 also rotates the compressor 12.

During operation of the engine 10, the compressor 12 spins and draws air into the engine, as illustrated by the arrow at the left of FIG. 1. The compressor 12 compresses the air and then forces the air into the combustion chamber 18 through the perforations in the flame holder 20. Fuel is injected into the combustion chamber 18 through the fuel injectors 22 and ignited. The resulting hot gases are expelled to the right of FIG. 1, where they drive the turbine blades and thereby spin the turbine 24, which, in turn spins the compressor 12. The hot gases are then exhausted from the engine 10, as illustrated by the arrow at the right of FIG. 1.

Figure 2:
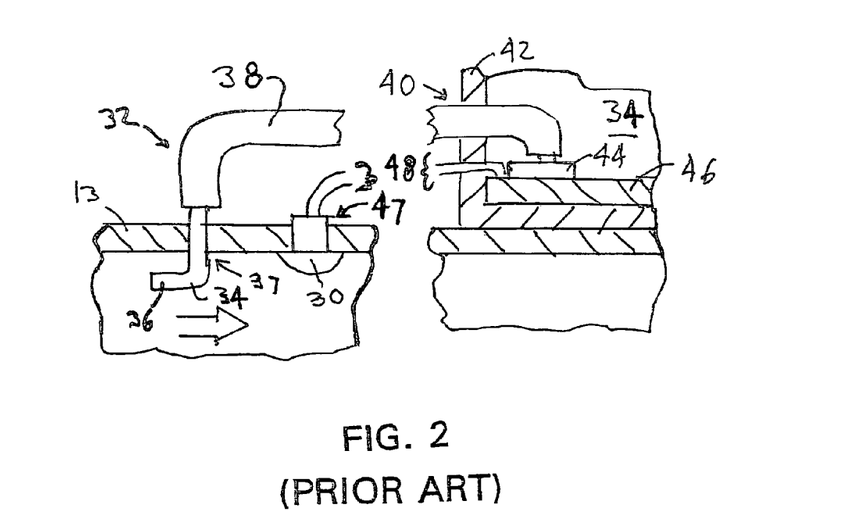
FIG. 2 is an enlarged view of a portion of FIG. 1.

Successful operation of the engine 10 requires that the flow of fuel into the combustion chamber 18 be carefully controlled. The fuel flow must be coordinated with the temperature and pressure of the air entering the engine intake housing 13. Typically, a temperature sensor 30 and a separate pressure probe 32 are mounted upon the engine intake housing 13 and provide air temperature and pressure data to an engine controller 34. As best seen in FIG. 2, the pressure probe 32 usually consists of a tube 34 having an open end 36 that extends through a first sensor opening 37 in the housing. The tube 34 is bent 90 degrees such that the open end 36 of the tube 34 receives a portion of the incoming air stream. A flexible hollow hose 38 is attached to the portion of the tube 34 that extends outside of the intake housing 13. The hose 38 passes through an aperture 40 formed in a side of an engine controller housing 42 and is attached to a pressure transducer 44. Thus, the pressure of the intake air is directly applied through the hose 38 to the pressure transducer 44. The pressure transducer 44, which generates an electrical voltage that is proportional to the air pressure within the tube 34 and hose 38, is mounted upon a Printed Circuit Board (PCB) 46 that is disposed within the controller housing 42.

Similarly, the temperature sensor 30 extends through a second sensor opening 47 in the intake housing 13 and is operative to generate a voltage that is proportional to the air temperature within the intake housing 13. The air temperature voltage is transferred over a wiring harness 48 that is attached to the temperature sensor 30 and extends through the side of the controller housing 42. The harness wires are electrically connected to conductive traces disposed upon the surface of the PCB 46. The PCB 46 also carries electronic components (not shown) that are responsive to intake air temperature and pressure for controlling the operation of the gas turbine engine 10. Typically, the temperature sensor wiring harness 48 terminates at an electrical connector (not shown) that is mounted upon the controller housing 42. The electrical connector allows removal of the engine controller for servicing without disturbing the temperature sensor 30.

As described above, it is known to mount separate temperature and pressure sensors upon the intake housing of a gas turbine engine. The pressure sensor is connected by a tube to a pressure transducer that is mounted within an engine controller. The engine controller may be mounted upon the engine or located remotely from the engine. Regardless of the engine controller location, an external wiring harness and associated electrical connector are required to connect the temperature sensor to the engine controller. The wiring harness would typically require electrical shielding. Additionally, a flexible pressure tube is needed to connect the pressure sensor to the engine controller. The wiring harness, electrical connector and pressure tube add weight and cost to the engine while reducing operational reliability. Additionally, two apertures are required in the engine intake housing for mounting the sensors. Accordingly, it would be desirable to simplify the mounting of the temperature and pressure sensors.

BRIEF SUMMARY OF THE INVENTION

This invention relates to a combined temperature and pressure probe for the intake air being supplied to a gas turbine engine.

The present invention contemplates a combined temperature and pressure probe that is adapted to extend into an engine air intake housing. The combined temperature and pressure probe includes a first bore extending into the body parallel to a central axis of the body and a second bore extending into the body parallel to the central axis that communicates with an inlet port formed in the body. A temperature transducer is disposed within the first bore while the second bore is adapted to cooperate with a pressure sensor. The invention also contemplates that the sensor may be mounted either upon the engine intake housing or within an engine controller housing.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 3:
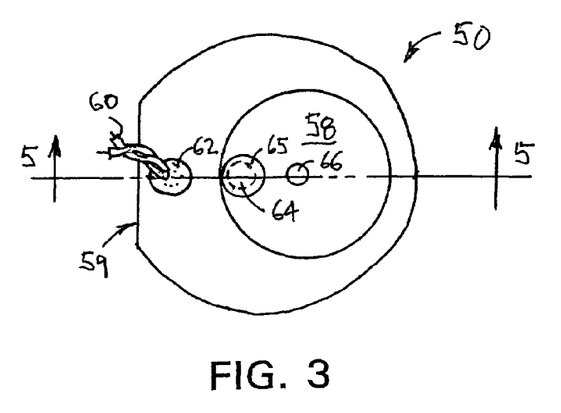
FIG. 3 is a plan view of a combined temperature and pressure probe that is in accordance with the present invention.
Figure 4:
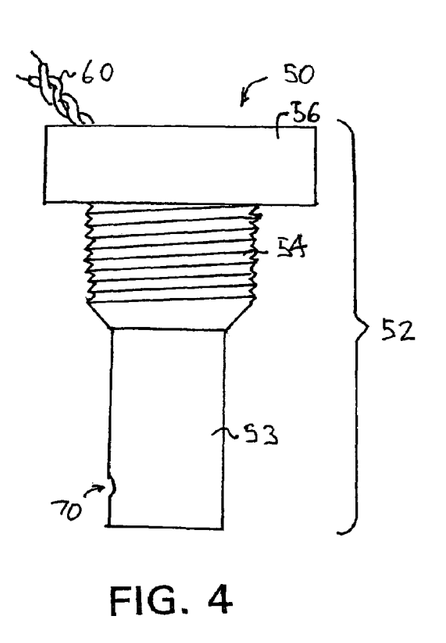
FIG. 4 is a side view of the probe shown in FIG. 3.

Referring again to the drawings, there is illustrated in FIGS. 3 and 4 a combined temperature and pressure probe 50 that is in accordance with the present invention. The probe 50 has a stepped cylindrical body that is formed from a durable metal such as aluminum, or an alloy such as brass, that has a high coefficient of heat conductivity. As best seen in FIG. 4, the probe body 52 has three stepped portions having different diameters. A lower portion 53 has the smallest diameter and extends into the air stream being sampled. A middle portion 54 has a diameter that is greater than the diameter of the lower portion 52 and is threaded to receive a securing nut, as will be explained below. An upper portion 56 has a diameter that is greater than the diameter of the middle portion 54. As will also be explained below, the probe upper portion 56 is contained within an engine control housing. A circular recess 58 is formed in the top surface of the probe upper portion 56. Additionally, a flat 59 is formed across the side of the upper portion 56. As will be explained below, the flat 59 keys the position of the probe 50 within an engine controller housing. A twisted pair of lead wires 60 extend from an access bore 62 formed in the probe 50.

Figure 5:
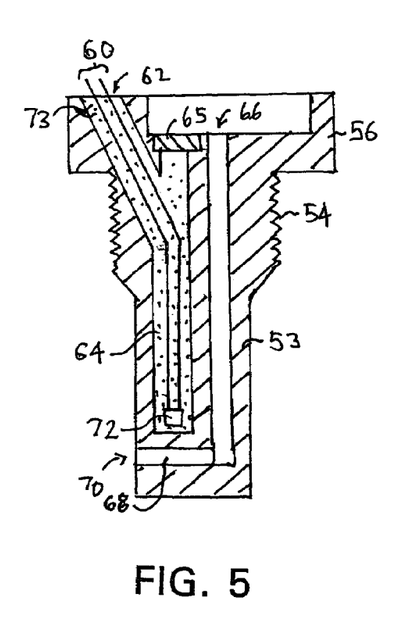
FIG. 5 is sectional side view of the probe shown in FIG. 3.

The interior configuration of the probe 50 is illustrated in FIG. 5 with a sectional side view. As shown in FIG. 5, the access bore 62 extends into the probe body at an angle of approximately 25 degrees from the sensor axis and intersects a first vertical bore 64. The first vertical bore 64 extends from the circular recess 58, through the upper and mid portions 56 and 54 of the probe and into the probe lower portion 53. The first bore 64 terminates within the lower portion 53. While FIG. 5 shows the first vertical bore terminating past the mid point of the lower portion 53, it will be appreciated that the invention also may be practiced with other lengths of the first vertical bore that what is shown. In the preferred embodiment, a plug 65 seals the upper end of the first vertical bore 64.

A second vertical bore 66 also extends from the circular recess 58, through the upper and mid portions 56 and 54 of the probe and into probe lower portion 53. The lower end of the second vertical bore 66 extends past the lower end of the first vertical bore 64. A horizontal bore 68 extends from the side of the probe lower portion 53 to the lower end of the second vertical bore 66 to form an air inlet port 70 in the side of the probe 50.

A temperature transducer 72 is disposed within the lower end of the first vertical bore 64. The twisted pair of lead wires 60 extend though the access and first vertical bores 62 and 64 and are soldered to the temperature transducer 72. In the preferred embodiment, the transducer 72 and lead wires 60 are assembled and then inserted into the bores 62 and 64. The bores 62 and 64 are then filled with a potting material 73 to secure the transducer 72 and lead wires 60 within the sensor 50. In the preferred embodiment, the potting material 73 has a high coefficient of heat conductivity. Because the probe body is formed from a metal having a high coefficient of heat conductivity and the potting material 73 also has a high coefficient of heat conductivity, the temperature of the air external to the probe 50 is conducted through the probe body and the potting material 73 to the temperature transducer 72. The temperature transducer 72 is operative to generate a signal across the lead wires 60 that is proportional to the transducer temperature. In the preferred embodiment, the temperature transducer signal is a voltage; however, the signal also may have other conventional forms, such as, for example, a current or a variable resistance or impedance value.

Figure 6:
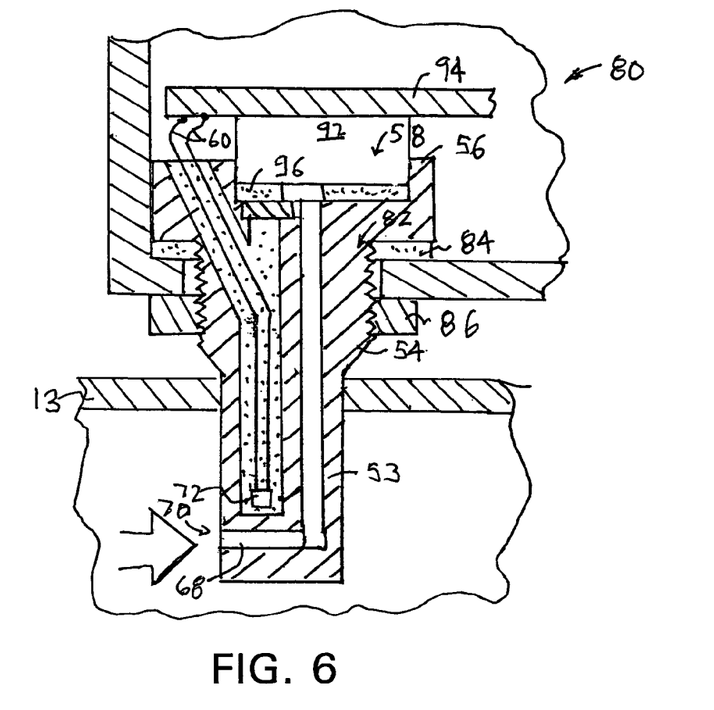
FIG. 6 is a sectional view of an engine controller that illustrates the mounting of the probe shown in FIG. 3.

The invention also contemplates an engine control housing 80 that receives the probe 50, as illustrated in FIG. 6. Components shown in FIG. 6 that are similar to components shown in the preceding drawings have the same numerical identifiers. As shown in FIG. 6, the lower and mid portions 53 and 54 extend through an aperture 82 formed through the bottom surface 83 of the housing 80. A first resilient annular ring 84 is disposed between the probe mid portion 53 and the top of the housing bottom surface 83. Thus, the ring 84 functions as a sealing gasket between the control housing 80 and the probe body. A nut 86 engages the threads formed on the surface of the probe mid portion 54 to secure the probe 50 within the housing 80. While a nut 86 has been shown as the preferred means for securing the probe 50, the invention also contemplates other methods of attachment, such as, for example, a snap ring, chemical or mechanical bonding and welding (not shown). If such alternate methods of attachment are utilized the surface of the probe mid portion 56 would not be threaded. The probe lower portion 53 also extends through an aperture 88 formed through a turbine engine air intake housing 13 and into the air stream passing therethrough. The flat 59 formed upon the side of the sensor upper portion 56 cooperates with a housing side wall 90 to orient the air inlet port 70 relative to air flow within the engine air intake housing 13, as illustrated by the arrow. The probe 50 is secured within the air intake aperture 88 by the engine control housing mounting (not shown).

The circular recess 58 formed in the probe upper portion 56 receives a gas pressure transducer 92 that is mounted upon a PCB 94. A second resilient annular ring 96 is disposed between the bottom surface of the circular recess 58 and the gas pressure transducer 92. Thus, the second ring 96 functions as a sealing gasket between the pressure transducer 92 and the probe body while the central opening through the ring allows pressurized air to reach the surface of the pressure transducer 92. The pressure transducer 92 is operative to generate a signal that is proportional to the air pressure applied thereto. In the preferred embodiment, the pressure transducer signal is a voltage; however, the signal also may have other conventional forms, such as, for example, a current or a variable resistance or impedance value. The pressure transducer 92 is electrically connected to conductive traces (not shown) disposed upon the surface of the PCB 94. Similarly, the pair of wire leads 60 extending from the temperature transducer 72 also are electrically connected to conductive traces disposed upon the surface of the PCB 94.

The operation of the combined probe 50 will now be described. As air passes through the turbine engine intake housing 13, a portion of the air flow enters the sensor inlet port 70. The pressurized air entering the inlet port 70 compresses the air contained within the horizontal and second vertical bores 68 and 66, respectively, which exerts a pressure against surface of the pressure transducer 92. Typically, the surface of the gas pressure transducer 92 is a diaphragm having a conventional strain gauge attached to the opposite surface. As pressure applied to the diaphragm increases, the diaphragm is deflected, causing the strain gauge to generate a pressure signal that is directly proportional to the amount of deflection and thus indirectly proportional to the applied pressure. The pressure signal is sensed by electronic components (not shown) carried upon the PCB 94. At the same time, the metal comprising the probe body and the potting material 73 contained within the first vertical bore 65 either lose or gain heat until they both reach an equilibrium temperature that is equal to the temperature of the ambient air surrounding the portion of the probe body that extends into the engine intake housing 13. The temperature sensor 72 is operative to generate a temperature signal that is proportional to the temperature of probe body and potting material, which also happens to be the ambient air temperature. The resulting temperature signal is transferred though the lead wires 60 to other electronic components (not shown) carried upon the PCB 94. The electronic components are responsive to the pressure and temperature signals to control the operation of the gas turbine engine 10.

Figure 7:
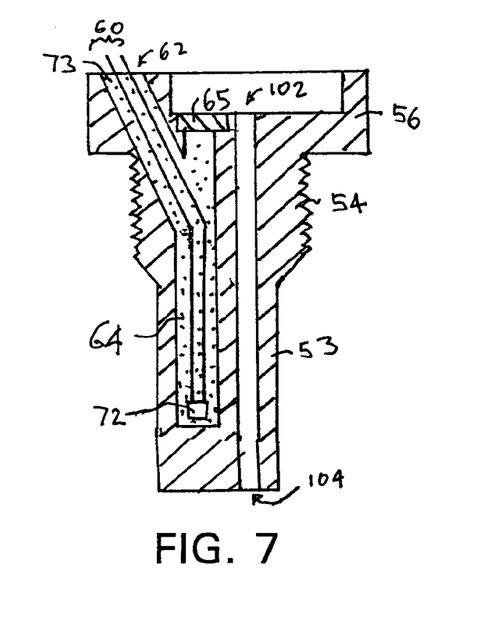
FIG. 7 is a sectional view of an alternate embodiment of the probe shown in FIG. 3.

The present invention also contemplates an alternate embodiment of the combined temperature and pressure probe that is shown generally at 100 in FIG. 7. Components shown in FIG. 7 that are similar to components shown in the proceeding figures have the same numerical identifiers. The alternate embodiment 100 includes a second vertical bore 102 that extends directly to the bottom surface of the lower probe body portion 53 to form an air inlet port 104. Thus, the combined probe 100 provides a static pressure value, while the sensor 50, shown in FIGS. 3 through 5, provides a total, or dynamic, pressure value that includes a component related to the velocity of the air passing the probe.

Figure 8:
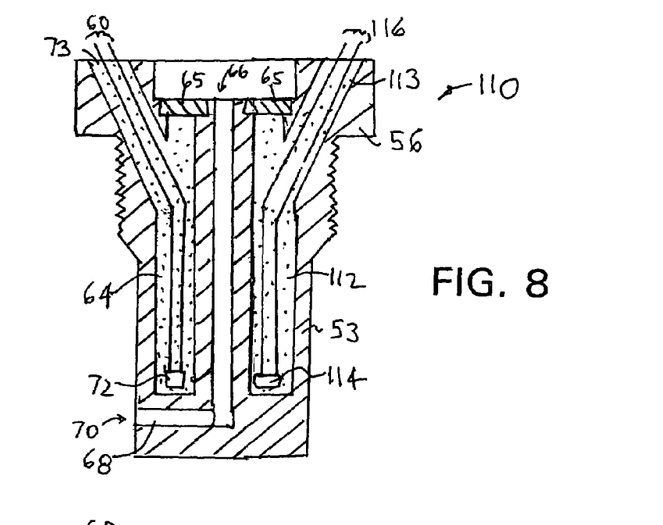
FIG. 8 is a sectional view of another alternate embodiment of the probe shown in FIG. 3.

Another alternate embodiment of the combined temperature and pressure probe is shown generally at 110 in FIG. 8. As before, components shown in FIG. 8 that are similar to components shown in the proceeding figures have the same numerical identifiers. The probe 110 includes a third vertical bore 112 and a second access bore 113 that extends into the probe body at an angle of approximately 25 degrees from the probe axis to intersect the third vertical bore 112. A conventional rotational motion sensor 114 for measuring rotational speed is disposed within the third vertical bore 112. In the preferred embodiment, a magnetic reluctance sensor is used for the motion sensor 114; however, other conventional motion sensors also may be used, such as, for example, an optical or Hall effect sensor. Similar to the first vertical bore 64 described above, the third vertical bore 112 is plugged and filled with potting material to secure the sensor 114 therein. A twisted pair of lead wires 116 extend from the pickup 114 through the third vertical bore 112 and the second access bore 113. The lead wires 116 are connected to components mounted upon a PCB in the engine controller (not shown). The rotational motion sensor 114 generates a signal as the turbine engine compressor blades 16 pass by. In the preferred embodiment, the signal is a series of voltage pulses with the frequency of the generated pluses proportional to the compressor speed; however, other signals may be used. While the probe 110 is shown with an air inlet port 70 that is oriented to measure total air pressure, the invention also contemplates adding a similar rotational speed sensor to the probe shown in FIG. 7 that measures static air pressure (not shown).

Figure 9:
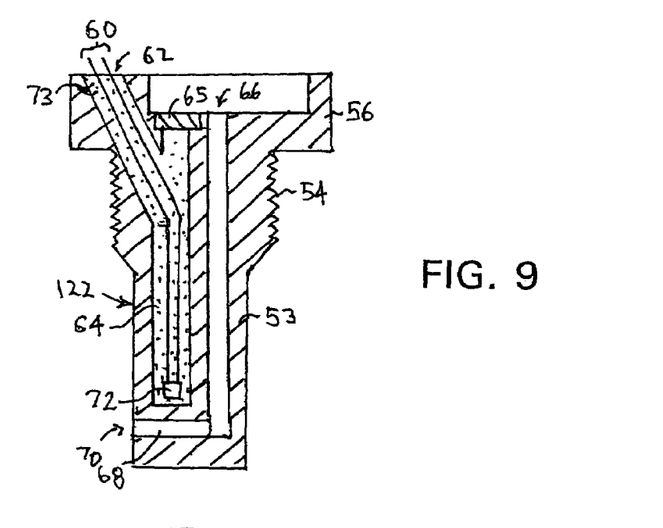
FIG. 9 is a sectional view of another alternate embodiment of the probe shown in FIG. 3.
Figure 10:
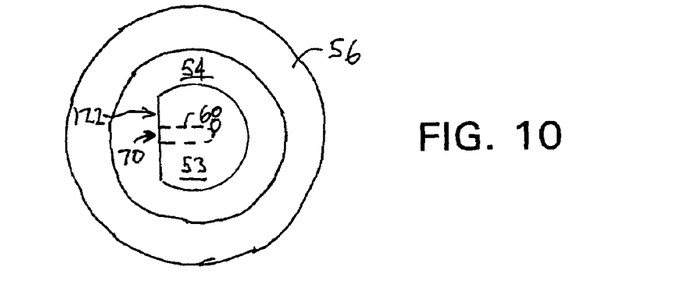
FIG. 10 is a bottom view of the probe shown in FIG. 9.

Yet another embodiment of the combined probe is shown at 120 in FIGS. 9 and 10. Again, components shown in FIGS. 9 and 10 that are similar to components shown in the proceeding figures have the same numerical identifiers. The probe 120 is similar to the probe 50 shown in FIGS. 3 through 5 except that a flat surface 122 is milled upon the lower portion 53. The flat surface 122 faces the direction of air flow within the intake housing 13. As the air flow through the housing 13 impacts the flat surface 13, momentum energy of the moving air is imparted to lower probe housing 53 in the form of heat. Thus, the probe 120 measures a total temperature that is equivalent to the temperature at the first-row of compressor fan blades. As shown in FIG. 9, the probe 120 measures total air temperature and total air pressure. It will be appreciated that the probe 120 also may be modified as illustrated in FIG. 7 to measure static air pressure and/or as illustrated in FIG. 8 to measure compressor rotational speed (not shown).

Figure 11:
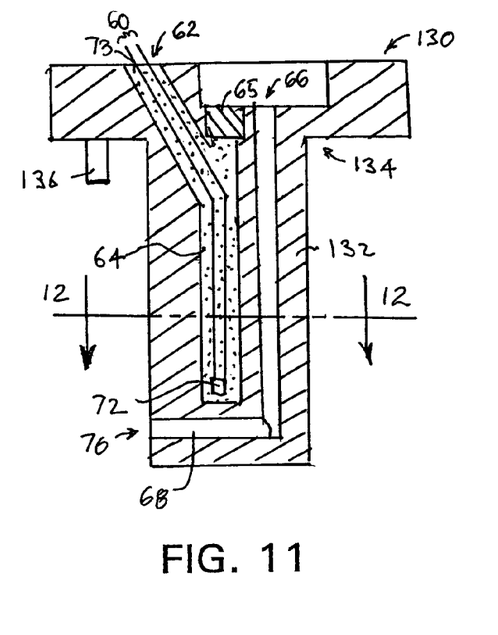
FIG. 11 is a sectional view of another alternate embodiment of the probe shown in FIG. 3.
Figure 12A:
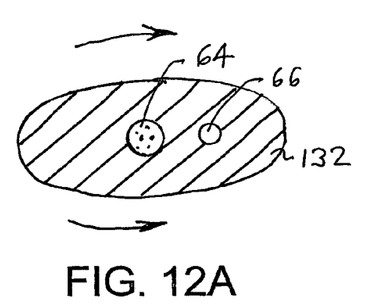
FIG. 12A is a cross sectional view of the probe taken along line 12—12 in FIG. 11.
Figure 12B:
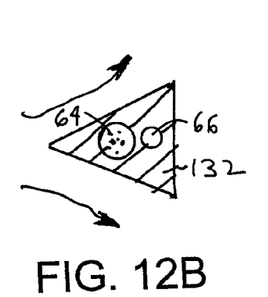
FIG. 12B is a cross sectional view of an alternate embodiment of the probe taken along line 12—12 in FIG. 11.
Figure 12C:
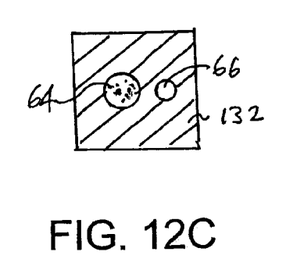
FIG. 12C is a cross sectional view of another alternate embodiment of the probe taken along line 12—12 in FIG. 11.
Figure 12D:
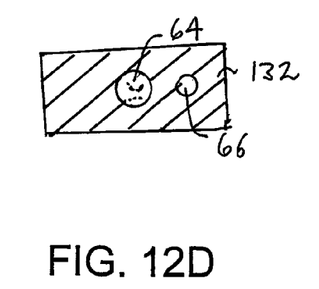
FIG. 12D is a cross sectional view of another alternate embodiment of the probe taken along line 12—12 in FIG. 11.

Another embodiment of the probe 130 is shown in FIG. 11. Components shown in FIG. 11 that are similar to components shown in the preceding figures have the same numerical identifiers. The probe has a non-stepped body 132. The probe 130 also has a an upper body portion 134 that extends beyond the body 132 to define a shoulder 134 for positioning the probe 130 relative to a controller housing or combustion turbine engine housing. Additionally, a pin 136 extends in a downward direction in FIG. 11 from the bottom surface of the upper body portion 134. The invention contemplates that the pin 136 would co-operate with a corresponding bore formed in a controller housing (not shown) or, as will be discussed below, in a gas turbine engine housing (not shown) to orient the probe 130 relative to the air flow through the engine. Thus, the probe 130 does include a flat surface 59 formed thereon as described above. Additionally, the probe 130, does not need to be located adjacent to an engine control housing side wall 90, as also described above. It will be appreciated that the orientation pin 136 also may be utilized with the other embodiments of the probe described above in lieu of the flat surface 59.

In the preferred embodiment, the probe body 132 is cylindrical; however the body 132 may also have other cross-sectional shapes, as illustrated in FIG. 12. In FIG. 12A, the probe body 132 has a generally elliptical cross-sectional shape to enhance the flow of air past the probe, as illustrated by the small arrows in FIG. 12. Alternately, the probe body 132 may have a triangular shape, as shown in FIG. 12B; a square shape, as shown in FIG. 12C; a rectangular shape, as shown in FIG. 12D; or other shapes that are not specifically illustrated, such as, for example, a polygon. For each of shapes shown in FIG. 12, the apertures 82 and 88 formed through the engine control housing and the combustion engine housing, respectively, would have corresponding shapes, with the probe body co-operating with the aperture to orient the probe 130 relative to the flow of air through the combustion turbine. Indeed, the invention also contemplates using the shapes of the probe body 132 and receiving apertures 82 and 88 in lieu of the locating flat surfaces and/or pins as described above. Additionally, combinations of shapes also can be used (not shown). For example, the square and rectangular shapes shown in FIGS. 12C and 12D could have rounded ends (not shown) to decrease air flow turbulence. Furthermore, the shapes shown in FIG. 12 may be applied to all of the probes described above.

Figure 13:
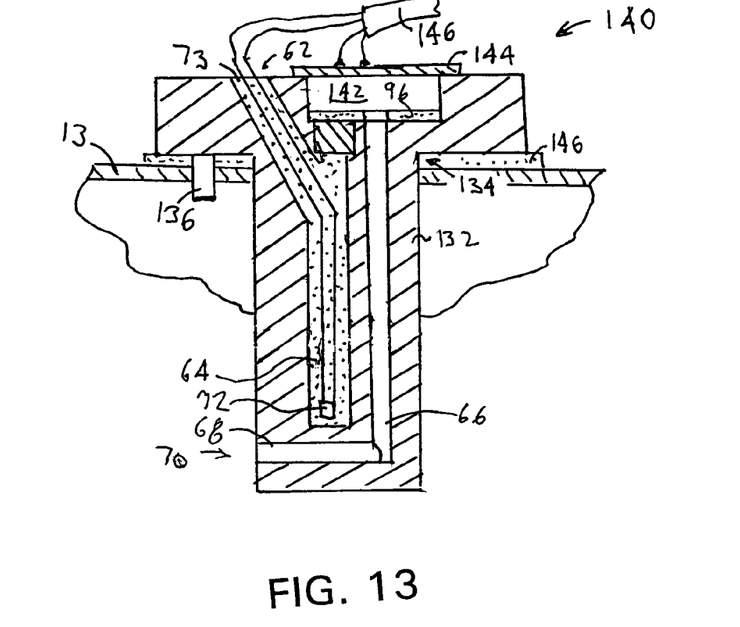
FIG. 13 is a sectional view of another alternate embodiment of the probe shown in FIG. 3.
Figure 14:
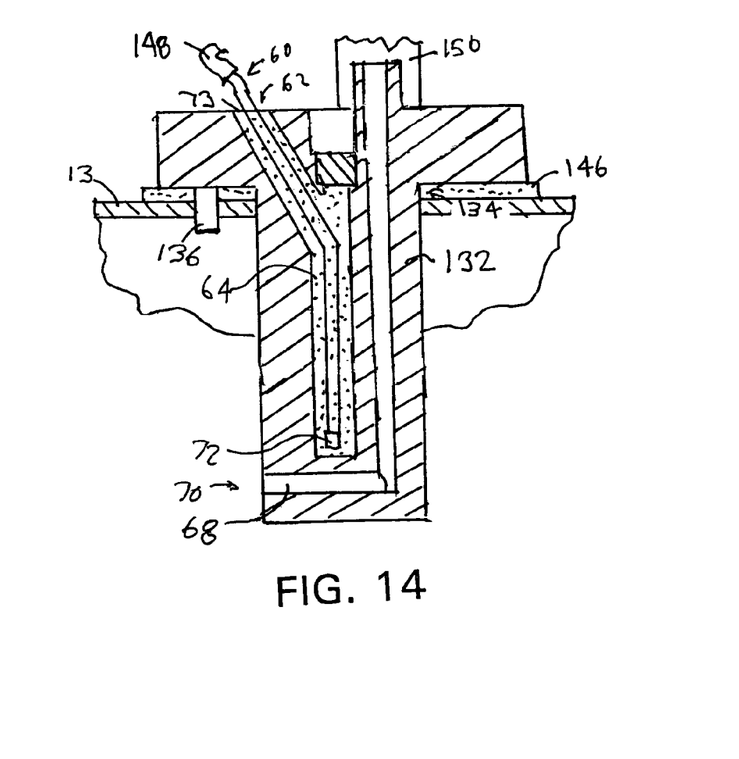
FIG. 14 is a sectional view of another alternate embodiment of the probe shown in FIG. 3.

While the preferred embodiment of the probe has been illustrated and described as being included within an engine control housing 80, it will be appreciated that the probe also may mounted upon the gas engine externally to the engine control housing. For example, another embodiment of the probe 140 is shown in FIG. 13 that is mounted directly upon the combustion engine housing 13. In FIG. 13, a pressure transducer 142 is mounted directly upon the probe and secured by a retainer 144. A resilient sealing gasket 146 is disposed between the probe 140 and the gas engine housing 13. As shown in FIG. 13, the probe 140 is oriented relative to the engine housing 13 by the pin 136; however, other methods of orientation also may be used. Both the temperature sensor 72 and the pressure transducer 142 are electrically connected to electronic engine control components contained within a engine control housing (not shown) by an external wiring harness 146. Alternately, the temperature sensor 72 may be connected with a wiring harness 148 while a length of tubing 150 connects the second vertical bore 66 to a pressure transducer that is disposed within the control housing (not shown), as illustrated in FIG. 14.

Thus, the present invention incorporates the sensing of air temperature and pressure into a single probe that extends into the air stream entering the engine. The probe is incorporated directly into the engine control housing, thereby eliminating expensive and less reliable electrical harnesses. Additionally, with the preferred embodiment, the number of electrical and pneumatic connectors is reduced which further reduces cost. Finally, assembly is simplified while the number of openings into the engine housing is reduced.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while one combined temperature and pressure probe has been illustrated and described, the invention also contemplates mounting a plurality of such combined probes upon a gas turbine engine to provide temperature and pressure data at multiple locations within the engine. Additionally, it is contemplated that the present invention may be used for different applications, such as, for example, sampling temperature and air flows within heating and air conditioning system ducts.

What is claimed is:

1. A probe for a gas turbine engine comprising:
   a probe body having a central axis, said probe body adapted to extend into a gas turbine engine housing;
   a first bore extending into said probe body parallel to said central probe axis, said first bore having a closed end;
   a second bore extending into said probe body parallel to said central probe axis and communicating with a gas inlet port formed in said probe body, said second bore adapted to cooperate with a pressure sensor;
   an access bore extending into said probe body from an end of said probe body opposite from said closed end of said first bore, said access bore intersecting said first bore;
   a temperature transducer disposed within said closed end of said first bore, said temperature transducer operable to change an electrical parameter in proportion to a change in temperature; and
   at least one electrical conducting path connected to said temperature transducer and extending though a portion of said first bore and said access bore to said end of said probe body.

2. The probe according to claim 1 wherein said probe body has a recess formed therein, said recess communicating with an end of said second bore, said recess receiving at least a portion of a gas pressure transducer within said recess such that said pressure transducer generates a signal that is proportional to the gas pressure within said second bore.

3. The probe according to claim 2 further including an annular ring of resilient material disposed within said recess formed within said probe body, said ring adapted to form a seal between said probe body and said gas pressure transducer.

4. The probe according to claim 2 wherein said probe body has a stepped generally cylindrical shape, said probe body including a first portion having a first diameter, a second portion that is coaxial with said first portion and having a second diameter that is less than said first diameter and a third portion that is coaxial with said second portion and having a third diameter that is less than said second diameter.

5. The probe according to claim 2 wherein said probe body has a generally cylindrical shape.

6. The probe according to claim 2 wherein said probe body has portion having a polygonal cross sectional shape that extends into said gas turbine housing.

7. The probe according to claim 2 wherein a pair of lead wires extend from said temperature transducer and through said first bore.

8. The probe according to claim 7 wherein the probe is mounted within an engine control unit housing with said probe body extending through an aperture formed through said housing and further wherein the probe also includes an annular ring of resilient material disposed about said probe body, said annular ring forming a seal between said probe body and said engine control unit housing.

9. The probe according to claim 7 wherein said second bore communicates with an inlet port formed in an end of said probe body.

10. The probe according to claim 7 wherein said second bore communicates with an inlet port formed in a side of said probe body.

11. The probe according to claim 10 further including a third bore extending into said probe body, said third bore receiving a single rotational motion sensor, said rotational motion sensor being operative to generate a signal that is proportional to the rotational velocity of an adjacent rotating object.

12. The probe according to claim 10 wherein said probe body includes a central axis and further wherein said probe body includes a flat surface that is generally parallel to said central probe body axis, said flat surface keying against an engine control unit housing to orient said probe body relative to said engine control unit housing.

13. The probe according to claim 1 further including a pressure sensor mounted upon said probe body, said pressure sensor communicating with an end of said second bore and operative to generate a signal that is proportional to the gas pressure within said second bore.

14. The probe according to claim 13 wherein said pressure sensor and said temperature transducer are electrically connected to gas turbine engine control components and are operative to provide data to said control components for controlling the gas turbine engine.

15. The probe according to claim 13 wherein the probe is mounted within a gas turbine engine control unit housing with said probe body extending from said control unit and into a gas turbine engine housing, said pressure sensor and said temperature transducer being electrically connected to gas turbine engine control components that are contained within said control unit housing and being operative to provide data to said control components for controlling the gas turbine engine.

16. The probe according to claim 1 wherein said probe body is adapted to be mounted upon a gas turbine engine housing with a portion of said probe body adapted to extend into said gas turbine housing and further wherein said probe body has a locator pin that is separate from said probe body portion extending into said gas turbine housing, said locator pin extending from said probe body and being received within a corresponding recess formed in said gas turbine engine housing and co-operating with said recess to orient said probe body with said gas turbine engine housing.

17. A probe for a gas turbine engine comprising:
    a probe body that is adapted to extend into a gas turbine engine housing, said probe body having a non-circular cross sectional shape that corresponds to the shape of an aperture formed through a gas turbine engine housing, said aperture receiving said probe body and co-operating therewith to orient said probe body within said gas turbine engine housing such that a gas inlet port formed in said probe body is positioned in a predetermined direction relative to said gas turbine engine housing;
    a first bore extending into said probe body;
    a second bore extending into said probe body and communicating with a gas inlet port formed in said probe body, said second bore adapted to cooperate with a pressure sensor; and
    a temperature transducer disposed within said first bore.

18. The probe according to claim 17 wherein the probe is mounted within an engine controller housing with said probe body extending through an aperture formed through said engine controller housing and further wherein said probe body has a flat portion formed upon a surface thereof, said flat portion being disposed within said engine controller housing and cooperating with said engine controller housing to orient said probe body relative to said controller housing.

19. The probe according to claim 17 wherein the probe is mounted within an engine controller housing with said probe body extending through an aperture formed through said engine controller housing and further wherein a portion of said probe body is threaded, said threaded portion cooperating with a threaded fastener to secure the probe within an engine controller housing.

20. The probe according to claim 17 wherein said probe body is adapted to be mounted upon the gas turbine engine housing and further wherein an end of said second bore communicates with a pressure sensor mounted within a gas turbine engine control unit, said pressure sensor being electrically connected to gas turbine engine control components and operative to supply a signal that is proportional to the gas pressure within said second bore and further wherein said temperature transducer is electrically connected to said gas turbine engine control components and operative to supply a signal that is proportional to the gas temperature within said gas turbine housing, whereby the pressure and temperature data is used by said engine control components to control the gas turbine engine.

21. The probe according to claim 17 further including a third bore extending into said probe body and a single rotational motion sensor disposed within said third bore, said rotational motion sensor being operative to generate a signal that is proportional to the rotational velocity of an adjacent rotating object.

22. A gas turbine engine control unit comprising:
    a control unit housing adapted to be mounted upon a gas turbine engine, said control unit housing having an aperture formed therethrough;
    a plurality of engine control components mounted within said gas turbine engine control unit housing, said control components operational to control a gas turbine engine;
    a probe body mounted within said control unit housing and extending through said housing aperture, said probe body adapted to extend into a gas turbine engine housing;
    a first bore extending into said probe body;
    a second bore extending into said probe body and communicating with a gas inlet port formed in said probe body;
    a pressure sensor disposed within said control unit housing and cooperating with said second bore, said pressure sensor electrically connected to said engine control components and operative to supply a signal that is proportional to the gas pressure within said second bore to engine control components; and
    a temperature transducer disposed within said first bore, said temperature sensor electrically connected to said engine control components and operative to supply a signal that is proportional to the gas temperature within the gas turbine engine to said engine control components.

* * * * *